United States Patent
Champavere

(10) Patent No.: US 11,215,528 B2
(45) Date of Patent: Jan. 4, 2022

(54) MULTIPLE FRONT-END DEVICE BASED HIGH SPEED OPTICAL TIME DOMAIN REFLECTOMETER ACQUISITION

(71) Applicant: Viavi Solutions France SAS, Plaisir (FR)

(72) Inventor: Andre Champavere, Saint-Bonnet les Oules (FR)

(73) Assignee: VIAVI SOLUTIONS FRANCE SAS, Plaisir (FR)

(*) Notice: Subject to any disclaimer, the term of this patent is extended or adjusted under 35 U.S.C. 154(b) by 21 days.

(21) Appl. No.: 16/717,430

(22) Filed: Dec. 17, 2019

(65) Prior Publication Data

US 2021/0080349 A1 Mar. 18, 2021

(30) Foreign Application Priority Data

Sep. 13, 2019 (FR) .................................. 19306108.2

(51) Int. Cl.
*H04B 10/071* (2013.01)
*G01M 11/00* (2006.01)

(52) U.S. Cl.
CPC .... *G01M 11/3136* (2013.01); *G01M 11/3145* (2013.01); *H04B 10/071* (2013.01)

(58) Field of Classification Search
CPC .......... G01M 11/3136; G01M 11/3145; H04B 10/071
See application file for complete search history.

(56) References Cited

U.S. PATENT DOCUMENTS

| 5,936,719 | A | 8/1999 | Johnson | |
|---|---|---|---|---|
| 10,012,563 | B1* | 7/2018 | Wang | G01M 11/3136 |
| 10,101,240 | B1* | 10/2018 | Bonche | G01M 11/3109 |
| 2006/0029115 | A1* | 2/2006 | Park | H01S 5/02375 372/36 |
| 2010/0030039 | A1* | 2/2010 | Lamego | A61B 5/14546 600/310 |
| 2012/0293472 | A1* | 11/2012 | Wong | G01J 1/0219 345/207 |
| 2013/0076270 | A1* | 3/2013 | Alexandrovich | H05B 47/18 315/362 |
| 2013/0194566 | A1* | 8/2013 | Schell | G01M 11/3136 356/73.1 |
| 2014/0362367 | A1* | 12/2014 | Chen | G01M 11/3127 356/73.1 |

(Continued)

FOREIGN PATENT DOCUMENTS

WO 2013/181197 12/2013

*Primary Examiner* — Maurice C Smith
(74) *Attorney, Agent, or Firm* — Mannava & Kang, P.C.

(57) ABSTRACT

In some examples, multiple front-end device based high speed OTDR acquisition may include measuring, in parallel, light transmission with respect to specified optical fibers of a plurality of optical fibers by utilizing a plurality of analog and optic front-end devices. A front-end interface may be operatively connected to the plurality of analog and optic front-end devices. The front-end interface may convert analog signals received from the specified analog and optic front-end devices to digital signals. A measurement controller may be operatively connected to the front-end interface to control operation of the plurality of analog and optic front-end devices, and analyze, based on the digital signals, a property of the specified optical fibers.

20 Claims, 6 Drawing Sheets

(56) References Cited

U.S. PATENT DOCUMENTS

| | | |
|---|---|---|
| 2015/0378954 A1 | 12/2015 | Field et al. |
| 2016/0041065 A1* | 2/2016 | L'Heureux ........ G01M 11/3154 356/73.1 |
| 2017/0085317 A1* | 3/2017 | Ruchet ............... G01M 11/3154 |
| 2017/0135175 A1* | 5/2017 | Sugimoto .............. H05B 45/10 |
| 2018/0017464 A1* | 1/2018 | Na ..................... H04B 10/0799 |
| 2019/0137355 A1* | 5/2019 | Nakatani ............ G01M 11/3136 |
| 2020/0064557 A1* | 2/2020 | Miller ................. G01M 11/335 |

\* cited by examiner

300

```
┌─────────────────────────────────────────────────────────────┐
│   MEASURE, BY SPECIFIED ANALOG AND OPTIC FRONT-END DEVICES OF│
│    A PLURALITY OF ANALOG AND OPTIC FRONT-END DEVICES, IN     │
│    PARALLEL, LIGHT TRANSMISSION WITH RESPECT TO SPECIFIED    │
│      OPTICAL FIBERS OF A PLURALITY OF OPTICAL FIBERS         │
│                            302                               │
└─────────────────────────────────────────────────────────────┘
                              ▼
┌─────────────────────────────────────────────────────────────┐
│  CONVERT, BY A FRONT-END INTERFACE OPERATIVELY CONNECTED     │
│   TO THE PLURALITY OF ANALOG AND OPTIC FRONT-END DEVICES,    │
│   ANALOG SIGNALS RECEIVED FROM THE SPECIFIED ANALOG AND      │
│         OPTIC FRONT-END DEVICES TO DIGITAL SIGNALS           │
│                            304                               │
└─────────────────────────────────────────────────────────────┘
                              ▼
┌─────────────────────────────────────────────────────────────┐
│      CONTROL, BY A MEASUREMENT CONTROLLER OPERATIVELY        │
│   CONNECTED TO THE FRONT-END INTERFACE, OPERATION OF THE     │
│      PLURALITY OF ANALOG AND OPTIC FRONT-END DEVICES         │
│                            306                               │
└─────────────────────────────────────────────────────────────┘
                              ▼
┌─────────────────────────────────────────────────────────────┐
│   ANALYZE, BY THE MEASUREMENT CONTROLLER, BASED ON THE       │
│   DIGITAL SIGNALS, A PROPERTY OF THE SPECIFIED OPTICAL FIBERS│
│                            308                               │
└─────────────────────────────────────────────────────────────┘
```

FIG. 3

MULTIPLE FRONT-END DEVICE BASED HIGH SPEED OPTICAL TIME DOMAIN REFLECTOMETER ACQUISITION

PRIORITY

The present application claims priority under 35 U.S.C. 119(a)-(d) to European patent application number 19306108.2, having a filing date of Sep. 13, 2019, the disclosure of which is hereby incorporated by reference in its entirety.

BACKGROUND

A fiber optic cable may include one or more optical fibers. The optical fibers may transmit light from a source to a destination. The transmitted light may be backscattered and reflected. The backscattered and reflected light may be analyzed to determine properties of the optical fibers.

BRIEF DESCRIPTION OF DRAWINGS

Features of the present disclosure are illustrated by way of example and not limited in the following figure(s), in which like numerals indicate like elements, in which:

FIG. 3 illustrates a flowchart of an example method for multiple front-end device based high speed OTDR acquisition in accordance with an example of the present disclosure.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Multiple front-end device based high speed OTDR acquisition systems, and methods for multiple front-end device based high speed OTDR acquisition are disclosed herein. The systems and methods disclosed herein provide for implementation of synchronous OTDR acquisitions, for example, by implementation of a plurality of OTDR measurements in parallel.

As disclosed herein, fiber optic cables may integrate a plurality of optical fibers. As data rate specifications increase, such specifications may result in an increase in a number of optical fibers in a fiber optic cable to therefore increase the capacity of the fiber optic cable. In some cases, measurement times associated with such optical fibers may be impacted by the number of optical fibers in the fiber optic cable. For example, an increase in a number of optical fibers in a fiber optic cable may result in relatively large overall measurement times associated with the fiber optic cable. This is because, in some cases, each optical fiber in a fiber optic cable may be sequentially measured. If the measurement time per optical fiber is reduced to reduce the overall measurement time for the fiber optic cable, such a reduction may negatively impact quality of the measurement results.

Figure 2:
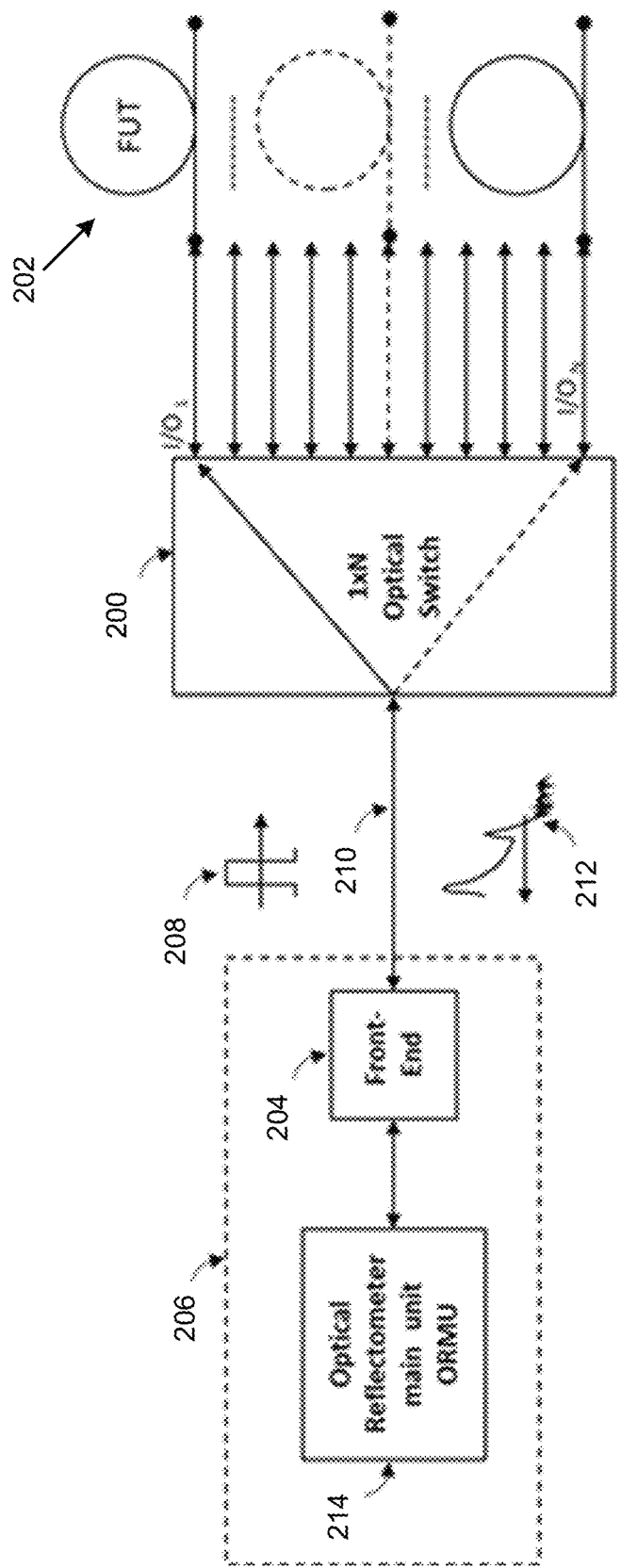
FIG. 2 illustrates an OTDR and optical switch arrangement for measurement of a plurality of optical fibers in accordance with an example of the present disclosure.

For example, FIG. 2 illustrates an OTDR and optical switch arrangement for measurement of a plurality of optical fibers in accordance with an example of the present disclosure.

With respect to FIG. 2, a time to measure an optical fiber of a fiber optic cable may depend on factors such as characteristics of the optical specifications, expected performance, and performance of the measuring device. For example, measuring dynamics of the measuring device may need to cover a link budget with a margin that is sufficient for the expected performance. In the case of reflectometric measurement, the measuring device may be connected to one end of an optical fiber that is to be measured. The measurements may be made sequentially, for example, by using an optical switch, to measure one optical fiber after another of a fiber optic cable.

For example, as shown in FIG. 2, with respect to automatic test configuration or fiber optic cable monitoring, an optical switch 200 may be utilized to time multiplex a measurement system. Thus, optical fibers 202 (e.g., fibers under test) may be tested sequentially. The optical switch 200 may be used to drive a single-port OTDR test signal to each test port onto which an optical fiber is connected. The optical switch 200 may be connected to a front end interface 204 of a fiber optic reflectometry system 206 (e.g., an OTDR). Further, the optical switch 200 may be connected to the optical fibers 202. An optical stimulus 208 from the front-end interface 204 may be injected at 210 into an optical fiber, and a return signal 212 (e.g., backscattering, reflection, etc.) may be converted into an electrical signal. The electrical signal may be analyzed in an optical reflectometer main unit (ORMU) 214.

The optical switch 200 may scan all of the optical fibers 202 with measurement parameters that may vary from fiber to fiber. A total measurement time may thus depend on each single fiber measurement time, and a number of fibers to be tested in a fiber optic cable. For example, an OTDR dynamic range may follow a 5 LOG 10($\sqrt{N}$) law or 2.5 LOG 10(N) law, where N is the averaging number (or averaging time), to thus result in a gain of 0.75 dB each time the acquisition time is doubled. For an example of a 16-fiber sequential test, for a given total measurement time, the 16 fiber sequential test may need an improvement of more than 3 dB of the measurement dynamics of the optical reflectometer main unit 214. Additionally, switching time for the optical switch 200 may also be added. Thus, it is technically challenging to reduce measurement time with respect to optical fibers, without negatively impacting quality of the measurement results. It is also technically challenging to reduce measurement time with respect to optical fibers without increasing the performance specifications (and thus cost) of a measurement unit.

In order to address at least the aforementioned technical challenges, the systems and methods disclosed herein may implement synchronous OTDR acquisitions. For example, the systems and methods disclosed herein may implement a plurality of OTDR measurements in parallel. In some examples, the systems and methods disclosed herein may achieve high speed OTDR acquisitions based on a plurality of independent front-end devices (e.g., analog and optic front-end (A&OF-E) devices as disclosed herein). For example, the independent front-end devices may include optical heads that may be utilized as a front-end of an array of OTDRs.

According to examples disclosed herein, with respect to the independent front-end devices, such devices may include optic, optoelectronic, and electronic hardware, without any dedicated signal processing. The independent front-end devices may be utilized as a front-end of a plurality of fiber-optic measurement instruments.

According to examples disclosed herein, with respect to the independent front-end devices, the measurement instruments may control operation of at least one independent front-end device as an OTDR.

According to examples disclosed herein, with respect to the independent front-end devices, an array of the front-end devices may be utilized as part of parallel mono-directional or multi-directional measurement systems.

According to examples disclosed herein, with respect to the independent front-end devices, the measurement instrument may include a loss test set, and an array of the front-end devices may be used as part of parallel measurement systems.

According to examples disclosed herein, with respect to the independent front-end devices, the measurement instruments may control operation of at least one independent front-end device as a distributed fiber sensing interrogator.

Figure 1A:
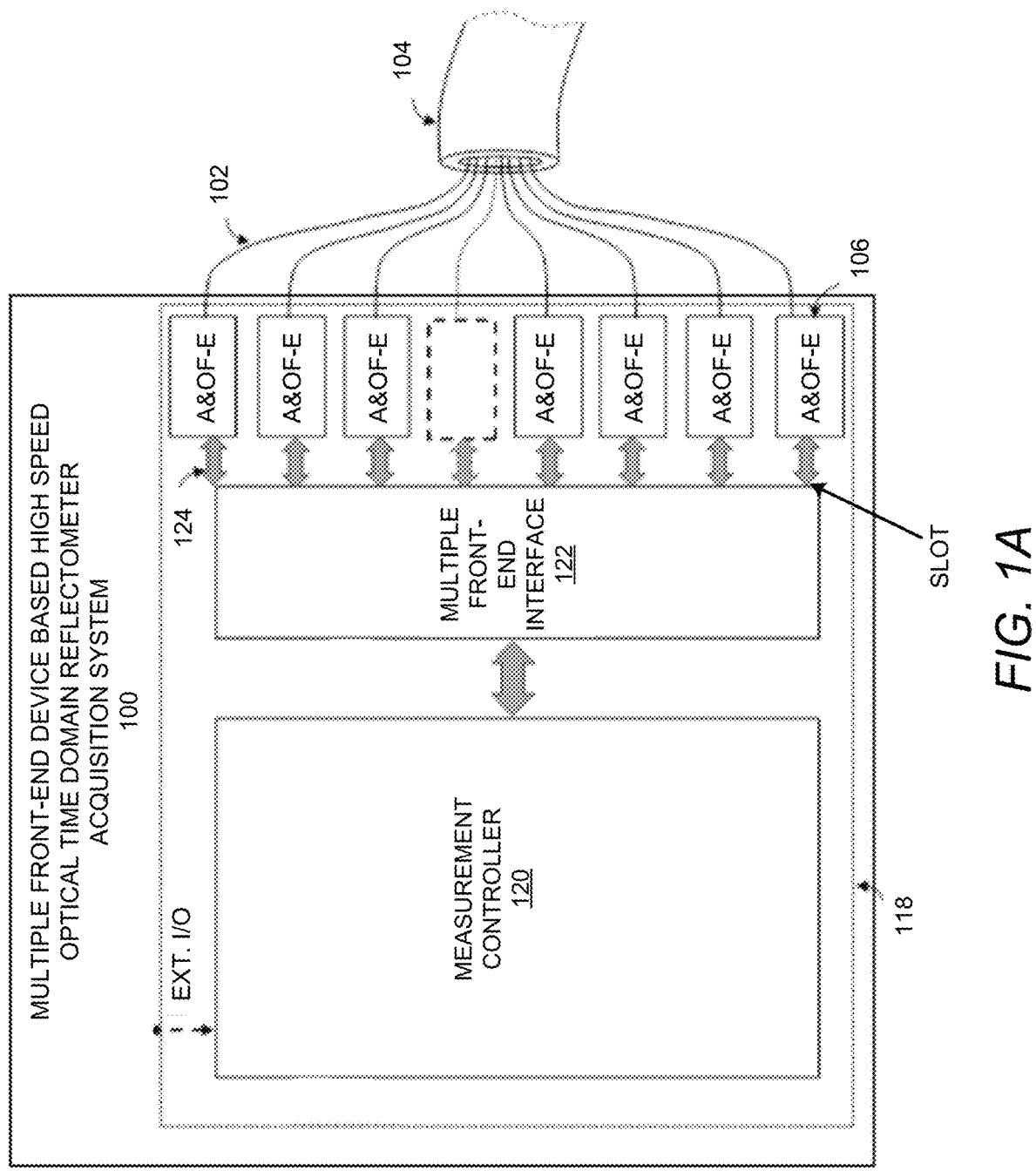
FIGS. 1A-1C illustrate an architectural layout of a multiple front-end device based high speed optical time domain reflectometer (OTDR) acquisition system in accordance with an example of the present disclosure.
Figure 1B:
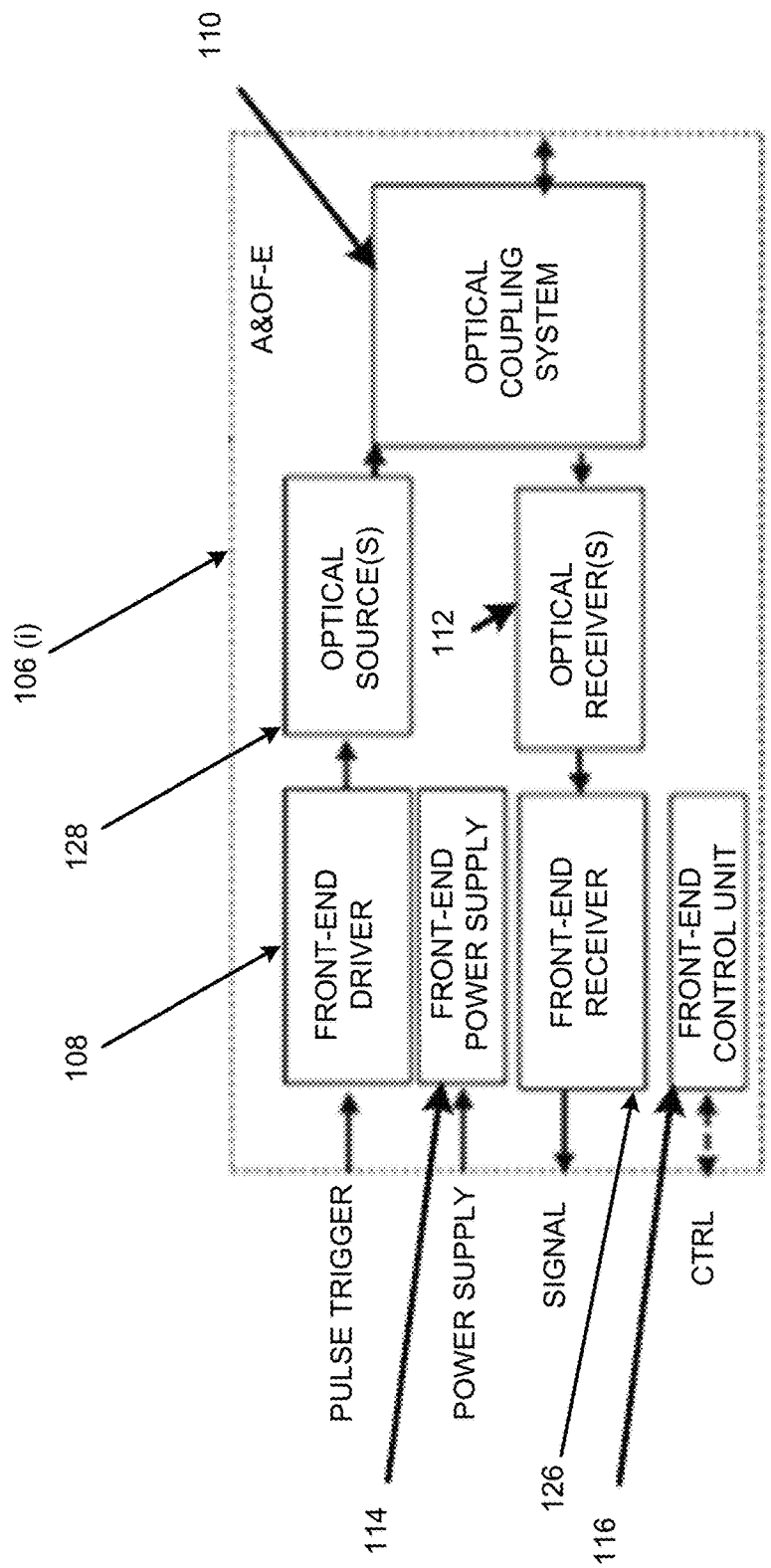
Figure 1C:
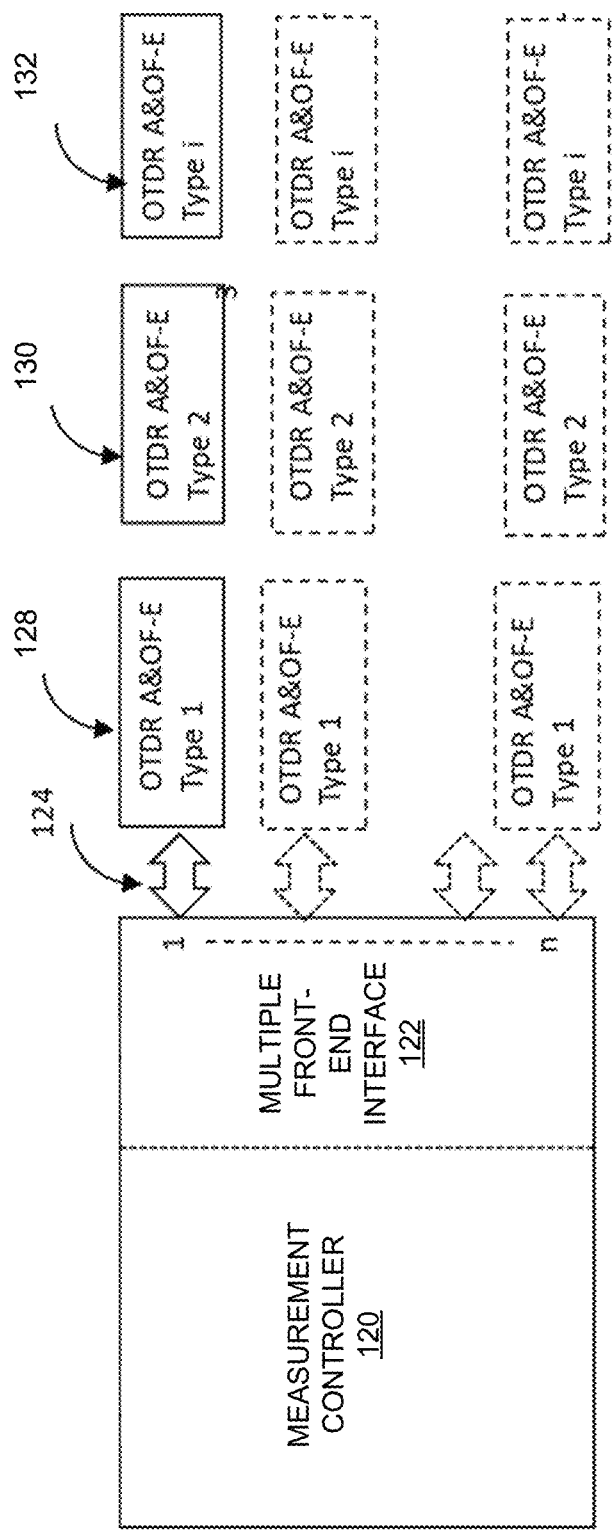

FIGS. 1A-1C illustrate an architectural layout of a multiple front-end device based high speed OTDR acquisition system (hereinafter also referred to as "system 100") in accordance with an example of the present disclosure.

Referring to FIGS. 1A-1C, with respect to optical fibers 102 of a fiber optic cable 104, a plurality of analog and optic front-end (A&OF-E) devices 106 may be implemented to simultaneously measure each optical fiber of the optical fibers 102. As shown in FIG. 1B, each A&OF-E device (e.g., 106(i)) may include a front-end driver 108, an optical coupling system 110, an optical receiver(s) 112, a front-end power supply 114, a front-end control unit 116, a front-end receiver 126, and optical source(s) 128. Thus, each A&OF-E device of a set of 1-to-n A&OF-E devices 106 may include components of an optical head of a measuring instrument, as well as a minimum set of electronic components to allow the A&OF-E devices 106 to operate. By using a physical interface (e.g., a multiple front-end interface 122 as disclosed herein), the A&OF-E devices 106 may be connected to corresponding ports (e.g., ports 1-n) of the multiple front-end interface 122. Further, by using a common electrical interface with the system 100, the modularity of the 1-to-n A&OF-E devices 106 may provide for the use of a specific A&OF-E device that provides specified measurements.

Referring to FIG. 1B, with respect to the aforementioned components of the A&OF-E devices 106, the optical coupling system 110 may include a beam splitter, an independent wavelength coupler, an optical circulator or any other optical component to guide or switch an emission beam from optical source(s) 128 in the fiber, and couple the return signal to the optical receiver(s) 112.

The optical coupling system 110 may include multiple ports for connecting multiple optical sources. The optical coupling system 110 may also include a plurality of ports on the optical receiver(s) side. In some applications, the optical coupling system 110 may include an optical filtering system for differentiating signals received at different wavelengths.

The front-end driver 108 may receive a control signal to control the optical source(s) 128. In this regard, FIG. 1B shows an example in which the front-end driver 108 receives a signal to trigger an OTDR pulse. In other examples, this signal may trigger a sequence of a modulated signal.

The optical source(s) 128 may generate the modulated optical signals (e.g., pulse, wave train, or other modulations). These signals may be transmitted to a fiber via the optical coupling system 110. Several optical sources may be combined to generate stimuli at different wavelengths or with different spectral widths, and/or with wavelength tunable devices.

The optical receiver(s) 112 may convert the optical signal received from a fiber under test (e.g., one of the optical fibers 102) via the optical coupling system 110. Examples of optical receivers may include an avalanche photodiode in the case of a reflectometric application, a PIN photodiode in radiometric applications or telemetry signals, and other such photodiodes.

The front-end receiver 126 may receive electric current from the optical receiver(s), and more precisely, from optoelectronic device(s), and may convert this photocurrent into an electrical signal that may be used by the multiple front-end interface 122. The conversion and pre-amplification of the current photocurrent from the photodiode may use a transimpedance amplifier for the current to voltage conversion. With respect to the electrical signal(s), the connection between the A&OF-E devices 106 and the multiple front-end interface 122 may use several lines and different technologies, such as symmetrical pairs, wireless channels or multiple serial data outputs (e.g., where the signal transmission from the A&OF-E devices 106 may be performed in a digital form). For example, in some cases when the signal line (e.g., wired or wireless) from an A&OF-E device may be relatively long or noisy, a serial analog to digital converter may be part of the A&OF-E devices and secure the transmission by using a digital signal. Thus, the "signal" indicated in FIG. 1B may represent an electrical raw signal from the front-end receiver 126 (sampled or not sampled).

As disclosed herein, multiple A&OF-E devices 106 may be operated in parallel when configured for an application with the aid of the corresponding application software running on the measurement controller 120. In this regard, the A & OF-E devices 106 and the other components of the system 100 may be designed to be software configurable.

The front-end power supply 114 may locally generate the needed power supply for operation of an A&OF-E device. For example, the front-end power supply 114 may supply power to the various components of an A&OF-E device (e.g., the front-end driver 108, the optical source(s) 128, the optical receiver(s) 112, the front-end receiver 126, and the front-end control unit 116). For example, in the case of an OTDR application, the front-end power supply 114 may generate an appropriate bias voltage of an avalanche photodiode forming part of the optical receiver(s) 112. The front-end power supply 114 may also provide the appropriate voltage and current for the optical source(s) 128.

The front-end control unit 116 may provide for control of the different elements of the A&OF-E devices 106. The front-end control unit 116 may include data registers that include calibration parameters such as bias voltages of optic sources and optical receivers for different modes of operation, and also the status of the A&OF-E devices 106.

For a measurement system block 118, the sequential mode may be replaced by a parallel mode in which a plurality of the optical fibers 102 are tested simultaneously using a plurality of corresponding A&OF-E devices 106. The A&OF-E devices 106 may be connected to a measurement controller 120 (also referred to as shared main electronic part of measurement system) through the multiple front-end interface 122. In this regard, the architecture of the system 100 may be divided with respect to the interfaces between the A&OF-E devices 106 and the multiple front-end interface 122, and the A&OF-E devices 106 may include limited built-in functions. Other functions such as analog-to-digital conversion functions and application-specific data processing may be performed outside of the A&OF-E devices 106. Thus, the measurement controller 120 may be used for multiple applications. Similarly, the multiple front-end interface 122 may include a plurality of interface connections that are configured for different types of A&OF-E devices 106. Thus, different measurement systems may be constructed by selecting the appropriate A&OF-E device connected to the multiple front-end interface 122 which may convert different signals into digital data which may be processed by the measurement controller 120. For example, sixteen A&OF-E devices 106 may be connected to the multiple front-end interface 122 which may allow the measurement controller 120 to process in parallel the data of sixteen reflectometric traces.

According to an example, the measurement controller 120 may be an OTDR. The measurement controller 120 may include measurement core features such as digital processing, data storage, power measurement, and an I/O interface. The measurement controller 120 may receive and process measurement raw data. The measurement controller 120 may include digital signal processing solutions, a memory space for data backup and results, and an interface to interact with various devices such as a screen, a printer, and a remote user. The separation between the measurement controller 120 and the multiple front-end interface 122 may be functional, and these two components may be physically implemented on the same electronic board or on different boards. However, with respect to the A&OF-E devices 106, an array of 1 to n A&OF-E devices 106 may utilize a physical interface (e.g., connector pinout) between the interfaces 124 and the A&OF-E devices 106. Thus, the multiple front-end interface 122 may include analog to digital conversion, and an A&OF-E interface.

Each A&OF-E device may be connected at one of the interfaces 124 to the multiple front-end interface 122, which may include a trigger line for laser modulation, power supply connection, control lines, and the analog electrical signal from a preamplifier.

According to an example, components of the A&OF-E devices 106 may be limited to the components shown in FIG. 1B, without the addition of components such as a microprocessor and a data processor for the received signal.

According to an example, each A&OF-E device may work simultaneously with other A&OF-E devices at their own wavelengths, and may be synchronized with one or more of the other A&OF-E devices. In this regard, the A&OF-E devices 106 may provide for the simultaneous measurement of several optical fibers in parallel, and for the gain in measurement time per fiber. The A&OF-E devices 106 may be synchronized to perform parallel measurements.

For an example of an OTDR application, a pulse trigger may be shifted to avoid power consumption peak. The integration of elements specific to an OTDR in an A&OF-E device may limit the applicability of the A&OF-E device. Thus the A&OF-E devices 106 may provide for utilization for an OTDR application, as well as other applications that include the use of optical sources and receivers connected to the same optical fiber.

An A&OF-E device may represent an optical head interfacing a fiber under test (e.g., one of the optical fibers 102) to the multiple front-end interface 122 to drive a plurality of other A&OF-E devices that may offer different features such as a continuous wave optical return loss (ORL) meter, OTDR, Echo meter, chromatic dispersion measurement, distributed fiber sensing measurements, or data link.

For example, as disclosed herein, the system 100 may include a set of 1 to n A&OF-E devices 106, where each of the A&OF-E devices may be limited to including optical and optoelectronic components, and a minimum set of electrical components to provide for operation of the A&OF-E devices and for the exchange of data with other instruments of the system 100. Yet further, as shown in FIG. 1A, by using a common physical interface such as the multiple front-end interface 122, the connectable or pluggable A&OF-E devices may be used to build a plurality of fiber optic measurement instruments.

For example, referring to FIG. 1C, FIG. 1C illustrates an example of a configuration that may be used for the parallel measurement of several optical fibers using an array of 1 to n A&OF-E devices 106 for a reflectometric measurement application. The common interfaces 124 may allow different types of A&OF-E devices 128, 130, and 132 to be connected, depending on the need of the OTDR application. For example, the A&OF-E devices 128 may be equipped with optical or opto-electronic components of relatively low performance, the A&OF-E devices 130 may be equipped with relatively high-performance pulsed laser diodes to cover high dynamic measurement needs, etc. This flexibility may thus provide for the possibility to adjust the cost of the system 100, and the cost of the 1 to n ports of the interfaces 124. In this example, the measurement system block 118 may be formed by a combination of an array of AO&F-E devices and the shared part of measurement controller 120 and the multiple front-end interface 122.

For the example of FIGS. 1A-1C, even a single A&OF-E device may be used in several modes. For example, the optical sources and the photodiodes may be used to generate a continuous optical signal, and to then measure optical return loss (e.g., to form an ORL meter). For example, the A&OF-E devices 106 may include a plurality of sources of different wavelengths to generate a Raman backscattering signal (e.g., Stokes, Anti-Stokes), which may be detected by one or two photodiodes dedicated to these wavelengths. The photocurrents may be transmitted to the front-end receiver 126, and then the signals may be transmitted to the multiple front-end interface 122 to be digitalized. Temperature measurement may be processed by the front-end receiver 126 using the Raman backscatter data.

Chromatic dispersion may be performed with an A&OF-E device using either a broadband source and a tunable receiver, or using a tunable source and a broadband receiver (e.g., frequency scanning technique).

An A&OF-E device including a modulated laser may be used to transmit data, such as the measurement results on the optical fiber.

According to examples disclosed herein, the A&OF-E devices may facilitate implementation of a plurality of functions that may be synchronized together to build extended features such as parallel OTDR measurements, bidirectional parallel measurements, or any combinations of several A&OF-E devices 106.

The A&OF-E devices 106 may share the same type of interfaces 124. If the A&OF-E devices 106 are designed as pluggable units, any of the A&OF-E devices 106 may be plugged into any slot associated with the interfaces 124. Even for use cases that include working at a same pulse with condition and distance sampling rate, implementation of the A&OF-E devices 106 as pluggable units may provide the capability of working at different wavelengths, with different pulse powers, and other different performance criteria. For example, the implementation of the A&OF-E devices 106 as pluggable units may be used when a second and shorter pulse width is needed for higher accuracy with respect to fault localization.

According to examples disclosed herein, with respect to the A&OF-E devices 106, such devices may include optic, optoelectronic, and electronic hardware, without any dedicated signal processing. The A&OF-E devices 106 may be utilized as a front-end of a plurality of fiber-optic measurement instruments.

According to examples disclosed herein, with respect to the A&OF-E devices 106, the measurement controller 120 may control operation of one or more A&OF-E device(s) of the plurality of A&OF-E devices 106 as an OTDR. In this regard, according to one example, the measurement controller 120 may control a single A&OF-E device that may make the system 100 equivalent to a single optical port instrument such as an OTDR with the possibility to interchange the optical front-end using different A&OF-E devices (e.g., user or factory configurable). According to another example, a single measurement controller 120 may control multiple A&OF-E devices 106.

According to examples disclosed herein, with respect to the A&OF-E devices 106, an array of the A&OF-E devices may be utilized as part of parallel mono-directional or multi-directional measurement systems. In this regard, bidirectional OTDR testing may represent a method of optical fiber characterization and loss testing that is performed from both ends of an optical fiber, for example, to provide increased accuracy and precision. For example, two measurement system blocks (e.g., the measurement system block 118) may be connected on each end of a fiber optic cable. In the case of OTDR measurements on a multi-fiber cable or a multicore fiber, both ends of each fiber optic cable or each core may be connected to an A&OF-E device used as an OTDR A&OF-E device. In this regard, the optical source(s) 128 may be utilized in an OTDR mode such as a pulsed mode with the optical receiver(s) 112 configured for acquiring an OTDR signal from an optical fiber (e.g., Rayleigh backscatter signal plus signal from reflective events). With respect to the OTDR mode, according to an example of a configuration of the system 100, most of the A&OF-E devices 106 may be designed to support OTDR mode, while other A&OF-E devices that are to operate as a continuous light source or as a power meter may support a loss test set mode where the optical source(s) 128 may be configured to operate in a continuous wave (CW) mode with an optical receiver using a dedicated bias voltage to perform CW optical power measurement. When using an A&OF-E device in an OTDR mode, an OTDR application software may operate on the measurement controller 120. This configuration that includes both ends may provide bi-directional OTDR measurements.

According to examples disclosed herein, with respect to the A&OF-E devices 106, the configuration of FIGS. 1A and 1B may be operated as a loss test set, and an array of the A&OF-E devices may be used as part of parallel measurement systems.

According to examples disclosed herein, with respect to the A&OF-E devices 106, the measurement controller 120 may control operation of one or more A&OF-E device(s) of the plurality of A&OF-E devices 106 as a distributed fiber sensing interrogator. In this regard, according to an example, the measurement controller 120 may control a single A&OF-E device to operate the system 100 as a single optical port fiber sensing instrument such as a distributed temperature sensing (DTS) interrogator with the possibility to interchange the optical front-end using different A&OF-E devices (e.g., user or factory configurable). According to an example, the A&OF-E devices 106 may be used to build a single-source DTS interrogator or a different type of interrogator that includes embedded optical and electrical hardware to implement a dual-source DTS. Alternatively, a single measurement controller 120 may control multiple A&OF devices 106 to sense multiple optical fibers in parallel, such as for using a DTS array for simultaneous fire detection.

FIG. 3 illustrate a flowchart of a method 300 for multiple front-end device based high speed OTDR acquisition, according to examples. The method 300 may be implemented on the system 100 described above with reference to FIGS. 1A-1C by way of example and not limitation. The method 300 may be practiced in other systems.

Referring to FIGS. 1A-1C, and 3, and particularly FIG. 3, at block 302, the method 300 may include measuring, by specified analog and optic front-end devices of a plurality of analog and optic front-end devices, in parallel, light transmission with respect to specified optical fibers of a plurality of optical fibers.

At block 304, the method 300 may include converting, by a front-end interface operatively connected to the plurality of analog and optic front-end devices, analog signals received from the specified analog and optic front-end devices to digital signals.

At block 306, the method 300 may include controlling, by a measurement controller operatively connected to the front-end interface, operation of the plurality of analog and optic front-end devices.

At block 308, the method 300 may include analyzing, by the measurement controller, based on the digital signals, a property (e.g., temperature variation, fiber bends, length, attenuation, joint loss, etc.) of the specified optical fibers.

Figure 4:
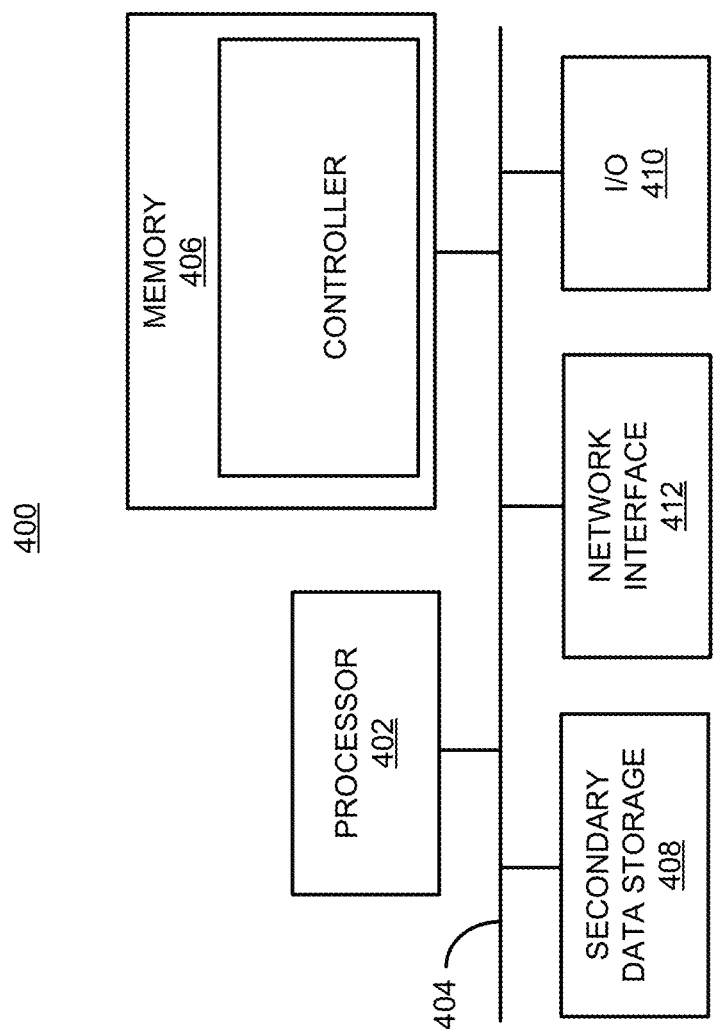
FIG. 4 illustrates a computer system, according to an example of the present disclosure.

FIG. 4 shows a computer system 400 that may be used with the examples described herein. The computer system may represent a platform that includes components that may be in a server or another computer system. The computer system 400 may be used as part of a platform for controllers of the system 100 (generally designated controller in FIG. 4). The computer system 400 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 may include a processor 402 that may implement or execute machine readable instructions performing some or all of the methods, functions and other processes described herein. Commands and data from the processor 402 may be communicated over a communication bus 404. The computer system may also include a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums. The main memory 406 may include the controller (e.g., for the system 100) including machine readable instructions residing in the main memory 406 during runtime and executed by the processor 402.

The computer system 400 may include an input/output (I/O) device 410, such as a keyboard, a mouse, a display, etc. The computer system may include a network interface 412 for connecting to a network. Other known electronic components may be added or substituted in the computer system.

The processor 402 may be designated as a hardware processor. The processor 402 may execute operations associated with various components of the system 100. For example, the processor 402 may execute operations associated with the controller (e.g., for the system 100), etc.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A multiple front-end device based high speed optical time domain reflectometer (OTDR) acquisition system comprising:
   a plurality of analog and optic front-end devices that include optical heads, wherein specified analog and optic front-end devices of the plurality of analog and optic front-end devices are to measure, in parallel, light transmission with respect to specified optical fibers of a plurality of optical fibers;
   a front-end interface operatively connected to the plurality of analog and optic front-end devices, wherein the front-end interface is to convert analog signals received from the specified analog and optic front-end devices to digital signals; and
   a measurement controller operatively connected to the front-end interface to
   control operation of the plurality of analog and optic front-end devices, and
   analyze, based on the digital signals, at least one property of the specified optical fibers.

2. The multiple front-end device based high speed OTDR acquisition system according to claim 1, wherein each analog and optic front-end device of the plurality of analog and optic front-end devices includes a driver to control operation of an optical source to generate a modulated optical signal that is transmitted to a corresponding optical fiber of the specified optical fibers.

3. The multiple front-end device based high speed OTDR acquisition system according to claim 1, wherein each analog and optic front-end device of the plurality of analog and optic front-end devices includes an optical coupling system including a beam splitter, wherein the optical coupling system is to:
   control transmission of a modulated optical signal that is transmitted to a corresponding optical fiber of the specified optical fibers; and
   couple a return signal from the corresponding optical fiber to an optical receiver.

4. The multiple front-end device based high speed OTDR acquisition system according to claim 1, wherein each analog and optic front-end device of the plurality of analog and optic front-end devices includes a power supply to locally generate power for operation of a corresponding analog and optic front-end device.

5. The multiple front-end device based high speed OTDR acquisition system according to claim 1, wherein each analog and optic front-end device of the plurality of analog and optic front-end devices includes a front-end receiver to:
   receive a photocurrent from an optical receiver that receives a return signal from a corresponding optical fiber of the specified optical fibers; and
   convert the photocurrent to an electrical signal for analysis of the at least one property.

6. The multiple front-end device based high speed OTDR acquisition system according to claim 1, wherein the measurement controller controls operation of at least one analog and optic front-end device of the plurality of analog and optic front-end devices as an OTDR.

7. The multiple front-end device based high speed OTDR acquisition system according to claim 1, wherein the measurement controller controls operation of at least one analog and optic front-end device of the plurality of analog and optic front-end devices as a distributed fiber sensing interrogator.

8. The multiple front-end device based high speed OTDR acquisition system according to claim 1, wherein the measurement controller includes digital signal processing to analyze the digital signals, and power measurement to measure power associated with the specified optical fibers.

9. The multiple front-end device based high speed OTDR acquisition system according to claim 1, wherein at least one analog and optic front-end device of the plurality of analog and optic front-end devices includes a pluggable configuration for plugging into a slot of a plurality of identical slots of the front-end interface.

10. The multiple front-end device based high speed OTDR acquisition system according to claim 1, wherein at least one analog and optic front-end device of the plurality of analog and optic front-end devices includes a different configuration compared to at least one other analog and optic front-end device of the plurality of analog and optic front-end devices.

11. A multiple front-end device based high speed optical time domain reflectometer (OTDR) acquisition system comprising:
   a plurality of analog and optic front-end devices that include optical heads, wherein
     specified analog and optic front-end devices of the plurality of analog and optic front-end devices are to measure, in parallel, light transmission with respect to specified optical fibers of a plurality of optical fibers, and
     each analog and optic front-end device of the specified analog and optic front-end devices includes:
       a driver to control operation of an optical source to generate a modulated optical signal that is transmitted to a corresponding optical fiber of the specified optical fibers; and
       an optical coupling system including a beam splitter, wherein the optical coupling system is to:
         control transmission of the modulated optical signal that is transmitted to the corresponding optical fiber of the specified optical fibers; and couple a return signal from the corresponding optical fiber to an optical receiver;

a front-end interface operatively connected to the plurality of analog and optic front-end devices, wherein the front-end interface is to convert analog signals received from the specified analog and optic front-end devices to digital signals; and a measurement controller operatively connected to the front-end interface to control operation of the plurality of analog and optic front-end devices, and analyze, based on the digital signals, at least one property of the specified optical fibers.

12. The multiple front-end device based high speed OTDR acquisition system according to claim 11, wherein each analog and optic front-end device of the plurality of analog and optic front-end devices includes a power supply to locally generate power for operation of a corresponding analog and optic front-end device.

13. The multiple front-end device based high speed OTDR acquisition system according to claim 11, wherein each analog and optic front-end device of the plurality of analog and optic front-end devices includes a front-end receiver to:

receive a photocurrent from an optical receiver that receives a return signal from the corresponding optical fiber of the specified optical fibers; and convert the photocurrent to an electrical signal for analysis of the at least one property.

14. The multiple front-end device based high speed OTDR acquisition system according to claim 11, wherein at least one analog and optic front-end device of the plurality of analog and optic front-end devices includes a pluggable configuration for plugging into a slot of a plurality of identical slots of the front-end interface.

15. The multiple front-end device based high speed OTDR acquisition system according to claim 11, wherein at least one analog and optic front-end device of the plurality of analog and optic front-end devices includes a different configuration compared to at least one other analog and optic front-end device of the plurality of analog and optic front-end devices.

16. A method for multiple front-end device based high speed optical time domain reflectometer (OTDR) acquisition, the method comprising:

measure, by specified analog and optic front-end devices of a plurality of analog and optic front-end devices that include optical heads, in parallel, light transmission with respect to specified optical fibers of a plurality of optical fibers, wherein each analog and optic front-end device of the specified analog and optic front-end devices includes:

a power supply to locally generate power for operation of a corresponding analog and optic front-end device; and a front-end receiver to:

receive a photocurrent from an optical receiver that receives a return signal from a corresponding optical fiber of the specified optical fibers; and convert the photocurrent to an electrical signal for analysis of at least one property of the corresponding optical fiber;

convert, by a front-end interface operatively connected to the plurality of analog and optic front-end devices, analog signals received from the specified analog and optic front-end devices to digital signals;

control, by a measurement controller operatively connected to the front-end interface, operation of the plurality of analog and optic front-end devices; and analyze, by the measurement controller and based on the digital signals, the at least one property of the specified optical fibers.

17. The method according to claim 16, further comprising:

for each analog and optic front-end device of the specified analog and optic front-end devices, controlling, by a driver, operation of an optical source to generate a modulated optical signal that is transmitted to the corresponding optical fiber of the specified optical fibers.

18. The method according to claim 16, further comprising:

for each analog and optic front-end device of the specified analog and optic front-end devices, controlling, by an optical coupling system including a beam splitter, wherein the optical coupling system is, transmission of a modulated optical signal that is transmitted to the corresponding optical fiber of the specified optical fibers, and coupling of a return signal from the corresponding optical fiber to an optical receiver.

19. The method according to claim 16, further comprising:

controlling, by the measurement controller, operation of at least one analog and optic front-end device of the plurality of analog and optic front-end devices as an OTDR.

20. The method according to claim 16, further comprising:

controlling, by the measurement controller, operation of at least one analog and optic front-end device of the plurality of analog and optic front-end devices as a distributed fiber sensing interrogator.

* * * * *